United States Patent

Hayes et al.

[11] Patent Number: 5,857,692
[45] Date of Patent: *Jan. 12, 1999

[54] TOWING APPARATUS FOR GOLF CARS

[75] Inventors: Paul E. Hayes, Evans; Donald G. Samuelson, Augusta; James R. Kerlin; Charles A. Fain, both of Evans, all of Ga.

[73] Assignee: Club Car, Inc., Augusta, Ga.

[*] Notice: The term of this patent shall not extend beyond the expiration date of Pat. No. 5,788,255.

[21] Appl. No.: 761,172

[22] Filed: Dec. 6, 1996

Related U.S. Application Data

[63] Continuation-in-part of Ser. No. 738,119, Oct. 25, 1996, Pat. No. 5,788,255, which is a continuation of Ser. No. 324,984, Oct. 18, 1994, abandoned.

[51] Int. Cl.$^6$ .................................................. B60D 1/24
[52] U.S. Cl. ...................... 280/410; 280/444; 280/491.3; 280/494
[58] Field of Search ..................................... 280/408, 410, 280/411.1, 419, 442, 443, 444, 478.1, 489, 480.1, 491.1, 491.3, 491.4, 491.5, 492–494, 498, 402, 501, 503, 504, 507

[56] References Cited

U.S. PATENT DOCUMENTS

| | | | |
|---|---|---|---|
| 1,848,956 | 3/1932 | Koehler | 280/491.3 |
| 1,949,962 | 3/1934 | Hess | 280/402 |
| 2,212,480 | 8/1940 | Rodin | 280/493 |
| 2,378,504 | 3/1945 | Roos | 280/491.1 |
| 2,859,050 | 11/1958 | Stonerock et al. | 280/483 |
| 2,918,310 | 12/1959 | Carson | 280/492 |
| 3,287,027 | 11/1966 | Schuckman | 280/491.3 |
| 3,627,352 | 12/1971 | Canole | 280/474 |
| 3,891,237 | 6/1975 | Allen | 280/478.1 |
| 4,382,607 | 5/1983 | Vioght | 280/408 |
| 4,655,467 | 4/1987 | Kitzmiller et al. | 280/444 |
| 4,666,177 | 5/1987 | Vinchattle | 280/477 |
| 4,678,199 | 7/1987 | Dickmann | 280/495 |
| 4,799,711 | 1/1989 | Moore | 280/444 |
| 5,097,609 | 3/1992 | Swaggert | 280/292 |
| 5,314,202 | 5/1994 | Wilkins, Jr. | 280/511 |
| 5,346,243 | 9/1994 | Boeck | 280/491.1 |
| 5,685,554 | 11/1997 | Poxleitner | 280/491.3 |

FOREIGN PATENT DOCUMENTS

| | | | |
|---|---|---|---|
| 2227739 | 12/1974 | France | 280/491.3 |
| 2225540 | 12/1973 | Germany | 280/491.3 |

*Primary Examiner*—Anne Marie Boehler
*Attorney, Agent, or Firm*—John J. Selko

[57] ABSTRACT

A towing arrangement for towing vehicles, such as golf cars. A pivotable, elongated towing bar is carried at the rear of a vehicle for pivotable movement about a horizontal pivot axis between an outwardly extending, towing position, and a retracted, upwardly extending, storage position. A towing bar gripper is attached to the car adjacent the rear end for releasably gripping the towing bar in the storage position. The gripper is formed by a resilient, generally U-shaped frame having a pair of opposed, spaced apart arms that form a slot into which a gripper bar is frictionally inserted and retained.

1 Claim, 7 Drawing Sheets

5,857,692

TOWING APPARATUS FOR GOLF CARS

This is a continuation-in-part of application Ser. No. 08/738,119, now U.S. Pat. No. 5,788, 255, which was filed on Oct. 25, 1996, which is a continuation of application Ser. No. 08/324,984, now abandoned, which was filed on Oct. 18, 1994.

BACKGROUND OF THE INVENTION

The present invention relates to towing apparatus for towing small, powered vehicles, such as golf cars and utility vehicles. More particularly, the present invention relates to a structural arrangement for towing a vehicle, wherein the arrangement includes a pivotable towing hook that is carried at the rear of a powered golf car or utility vehicle, and a towing hook receiver and retainer that is carried at the forward end of such a vehicle for cooperative engagement with a towing hook carried on another car.

DESCRIPTION OF THE RELATED ART

Most golf courses of any significance make available for golfers electrically-or gasoline-powered golf cars for transporting pairs of golfers and their golf clubs around the course. The cars are usually stored in some type of covered garage facility and must be retrieved and brought to the pro shop area for use by golfers. Thus, it is desirable to tow several cars together from the garage facility, rather than to bring the cars out individually. Additionally, when a golf car becomes disabled on the golf course, it becomes necessary to tow it to the garage facility for repairs. In the past, oftentimes a towing plate was provided at the forward end of the vehicle, the towing plate having an aperture to receive a pin carried by a drawbar, or the like, could be attached to the towing plate of the disabled vehicle to enable the disabled vehicle to be towed to a repair facility. That prior art arrangement did not permit a series or train of such vehicles to be towed, and it therefore had limited utility.

Another way in which disabled golf cars were returned to a repair facility involved the provision of a flat bed trailer, onto which the disabled golf car would be pushed so it could be transported.

It is an object of the present invention to provide an improved towing arrangement for golf cars, so that a disabled golf car can be positively towed by another golf car, and without the need for providing a separate trailer.

It is a further object of the present invention to provide a towing arrangement for golf cars wherein a train including a plurality of golf cars can be formed by interconnecting individual cars to enable the train of cars to be pulled by another golf car.

An example of one form of prior art towing arrangement is illustrated and described in U.S. Pat. No. 5,314,202, which issued on May 24, 1994, to Guy Wilkins, Jr. The Wilkins, Jr. patent discloses a golf car towing hitch system to permit a golf car to be towed behind a passenger vehicle or a light truck, and includes a hoist for lifting the rear wheels of the golf car above the ground.

SUMMARY OF THE INVENTION

In one aspect of this invention there is provided a wheeled vehicle including a frame having a longitudinal axis, a front wheel assembly and a rear wheel assembly, each wheel assembly rotatably carried by the frame, a body supported by the frame for carrying a load, and a steering system connected to at least one of the wheel assemblies for steering the vehicle, where the improvement comprises: a first elongated towing bar mounted on a first end of the vehicle; first means for mounting said first towing bar pivotably about a first, substantially vertical, pivot axis positioned at the frame longitudinal axis; second means for mounting said first towing bar pivotably about a second, substantially horizontal, pivot axis transverse to the frame longitudinal axis, wherein said first towing bar can be pivoted between an extended position and a retracted position; and means on said vehicle for releasably retaining said first towing bar in said retracted position.

DESCRIPTION OF THE PREFERRED EMBODIMENTS

Figure 1:
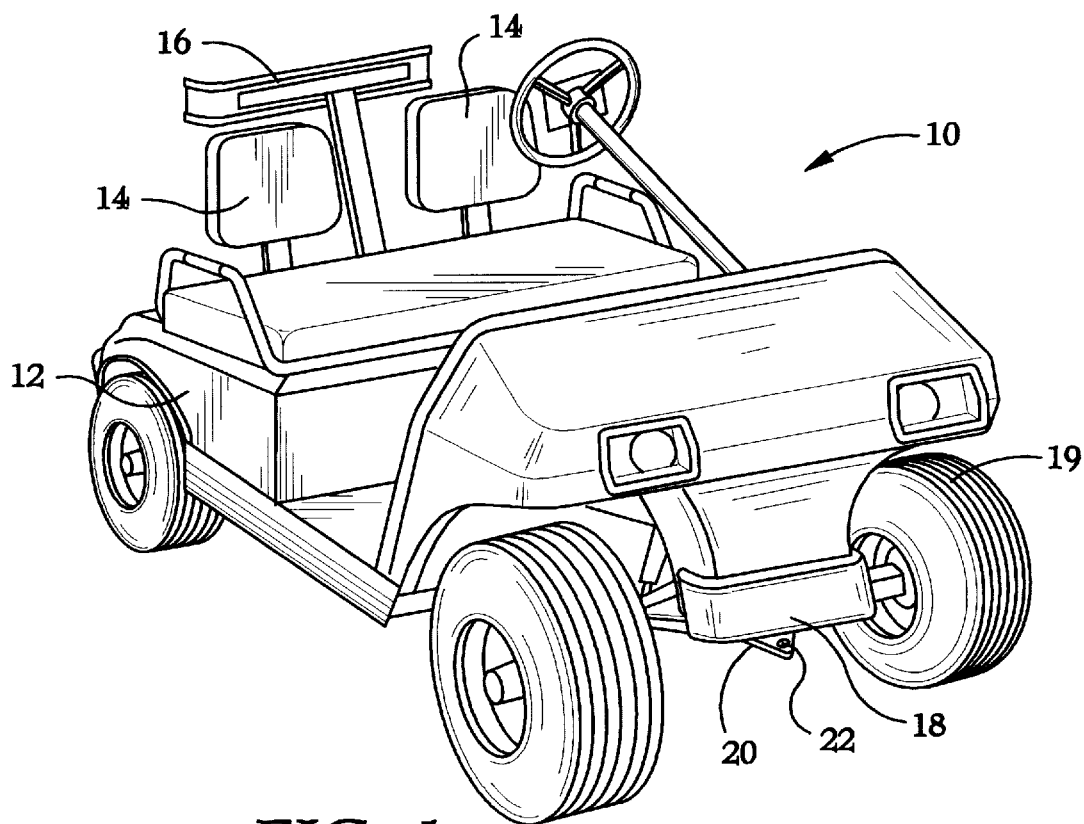
FIG. 1 is a front perspective view of a golf car of the type with which the present invention is applicable, showing a prior art towing plate positioned at the front of the car.

Referring now to the drawings, and particularly to FIG. 1 thereof, there is shown one form of golf car 10, to which the present invention is applicable. Golf car 10 includes a housing 12 within which a gasoline engine or a batter-powered motor can be provided and operatively connected with the rear wheels of the car through a differential (not shown) for propulsion of the car. Positioned immediately behind the seat backs 14 is a curved golf-bag-receiving hoop 16 to which one or a pair of golf bags (not shown) can be secured in an upright position to enable the golf clubs to be selectively removed.

In the embodiment illustrated in FIG. 1, golf car 10 includes a front bumper 18 that extends transversely of the car body and is positioned forward of the front wheels 19. Immediately below front bumper 18 and secured to the car frame (not shown) is positioned a prior art towing plate 20 having a towing aperture 22. A towing bar (not shown) carried by a towing vehicle is received on towing plate 20 and a retaining pin (not shown) carried by the towing bar is received in towing aperture 22 to permit connection of the towing bar with towing plate 20.

Figure 2:
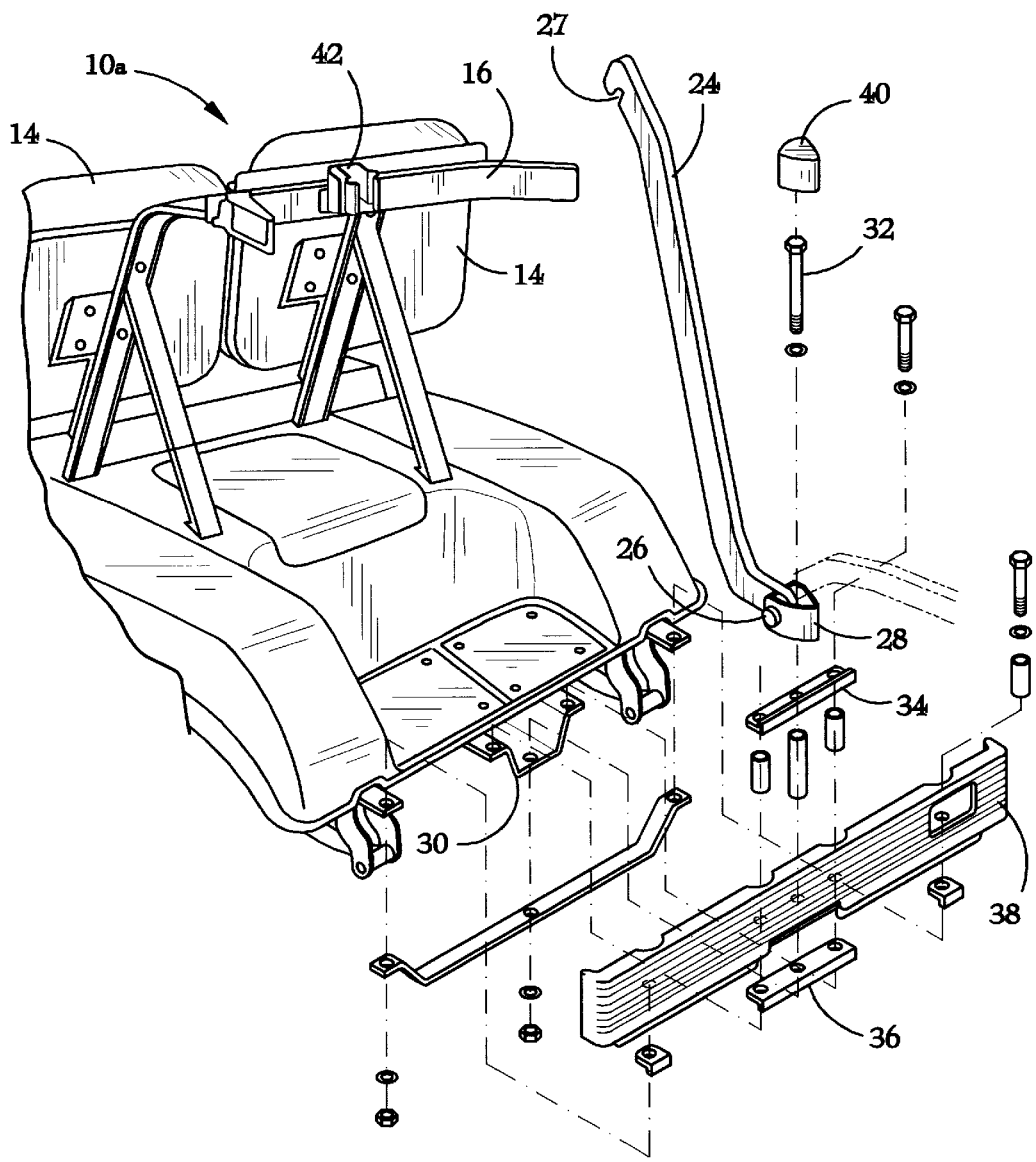
FIG. 2 is a fragmentary perspective rear view of a golf car having the general structure of the car shown in FIG. 1, partially in exploded form, and showing a towing bar assembly in accordance with the present invention in position at the back end of the car.

Referring now to FIG. 2, there is shown a rear view of a golf car 10*a* having the general form of the car illustrated in FIG. 1, but including an improved towing arrangement in accordance with the present invention. As shown in FIG. 2, an elongated towing bar 24 is pivotally carried at the rear portion of car 10*a* for pivotal movement in a vertical plane about a horizontal pivot axis defined by pivot pin 26. Towing bar 24 is received and retained in a pivot pin clevis 28 that is, in turn, bolted to a frame center channel member 30 by means of a connecting bolt 32, which defines a vertical pivot axis about which towing bar 24 is also pivotable. In order to provide a secure, rigid interconnection between towing bar 24 and channel member 30, an upper mounting angle 34 and a lower mounting angle 36 are provided and are attached to channel member 30 together with pin clevis 28. The towing bar connecting structure described forms part of the connecting arrangement for connecting a rear bumper 38 to the car, as shown in FIG. 2.

Towing bar 24 is shown in solid lines in FIG. 2, in its uppermost, retracted position, and is shown in that drawing figure in dashed lines in its lower, towing position. Carried within clevis 28 and positioned above connecting bolts 32, is a flexible, resilient bumper element 40 that can be made from rubber, if desired, and serves to exert a force against the towing bar 24 in a longitudinal direction of the golf car, to urge towing bar firmly against pivot pin 26, to thereby prevent the disturbing rattling noise that could otherwise arise from vibration of towing bar 24 when the car is in motion. Bumper element 40 also serves to define a lower stop that limits the downward movement of towing bar 24.

As also shown in FIG. 2, a towing bar gripper 42 is positioned substantially centrally on the rearward facing surface of golf bag retainer 16 to receive and firmly grip towing bar 24 when it is in its retracted position. The structural elements of towing bar gripper 42 are shown in greater detail and in exploded form in FIG. 3. As there shown, gripper 42 includes a rigid gripper support member 44, that preferably is a generally U-shaped metallic extrusion that includes a first slot 46, on each inner side of which an inwardly extending recess 48 is provided, and a second slot 47 adjacent to slot 46. Slot 47 is provided to support the handle of a sand rake (not shown), to smooth the sand in sand traps and bunkers on a golf course.

Figure 3:
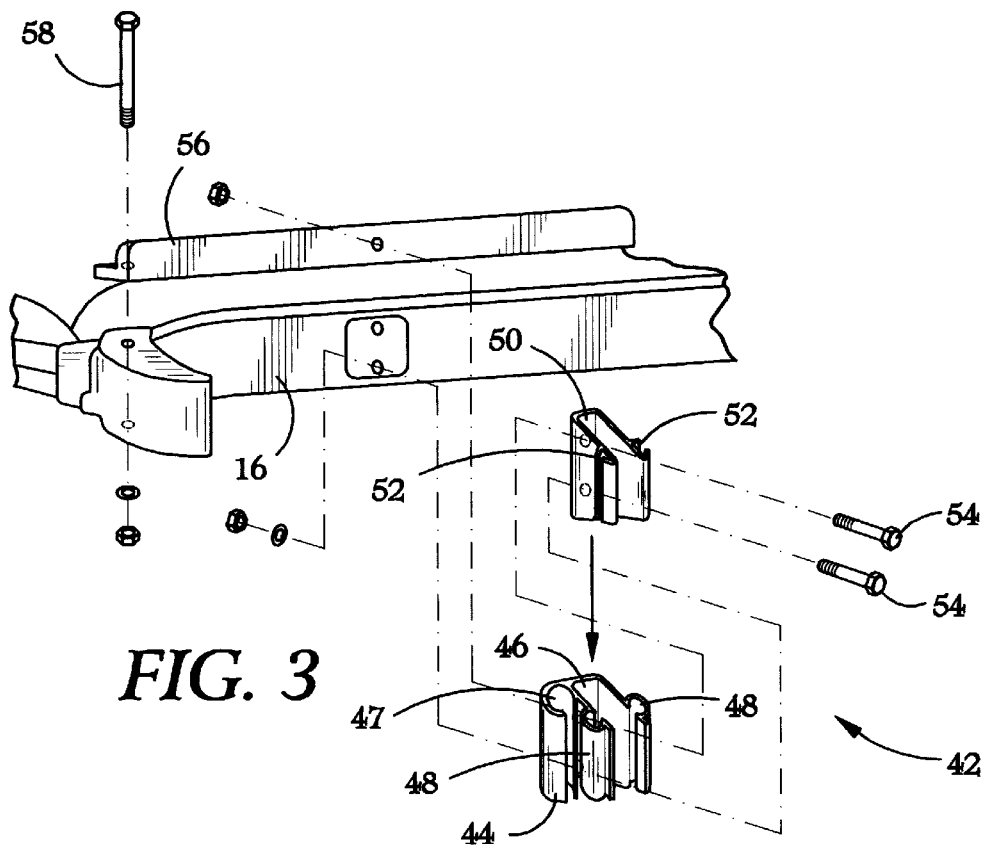
FIG. 3 is an enlarged, fragmentary rear perspective view, in exploded form, of the towing bar gripper and connections with a golf bag support hoop of the golf car shown in FIG. 2.

A U-shaped resilient gripper member 50, which can be a molded rubber element, is slidably received within slot 46 of gripper support 44, and includes a pair of oppositely outwardly extending, parallel ears 52 that are received within respective opposed, inwardly extending recesses 48 of gripper 42. Gripper member 50 is configured to grip and retain towing bar 24 when it is in its retracted position, and also serves to effectively isolate towing bar 24 from metallic gripper support member 44 so that the towing bar does not rattle or vibrate to cause disturbing noises when the vehicle is in motion. The assembly of gripper support 44 and interiorly-positioned rubber gripper member 50 is securely connected to golf bag retainer 16 by bolts 54 that extend through bag retainer 16 and through an angle brace 56. The outermost ends of angle brace 56 are connected with bag retainer 16 by mean s of a pair of connecting bolts 58, only one of which is shown in FIG. 3.

Referring to FIGS. 8–11, an alternate embodiment of a towing bar gripper is shown generally as 200. Gripper 200 is connected to the bag retainer 16 in a position similar to gripper 42. Gripper 200 is a rigid, but resilient, metallic, generally U-shaped frame having a pair of opposed, spaced apart, vertically extending sides 202 connected by a rear panel 204. Rear panel 204 includes a pair of vertically extending, spaced apart openings 206. A bolt 208 extends through each opening 206 to fasten gripper to bag retainer 16. Sides 202 form a slot 210 that is open in the direction of towing bar 24. Slot 210 extends vertically in a plane that is coincident with the vertical pivot axis formed by bolt 32 (FIG. 2). Slot 210 has an opening span 212 that is less than a corresponding dimension on the end of towing bar 24 that is to be gripped. Each side 202 flares outwardly to provide a contact surface 214 for guiding towing bar 24 into slot 210 while it resiliently spreads apart sides 202. We prefer to provide gripper 200 from stainless steel having a composition of AISI 301, with a hardness of 48–52 Rockwell C.

Figure 4:
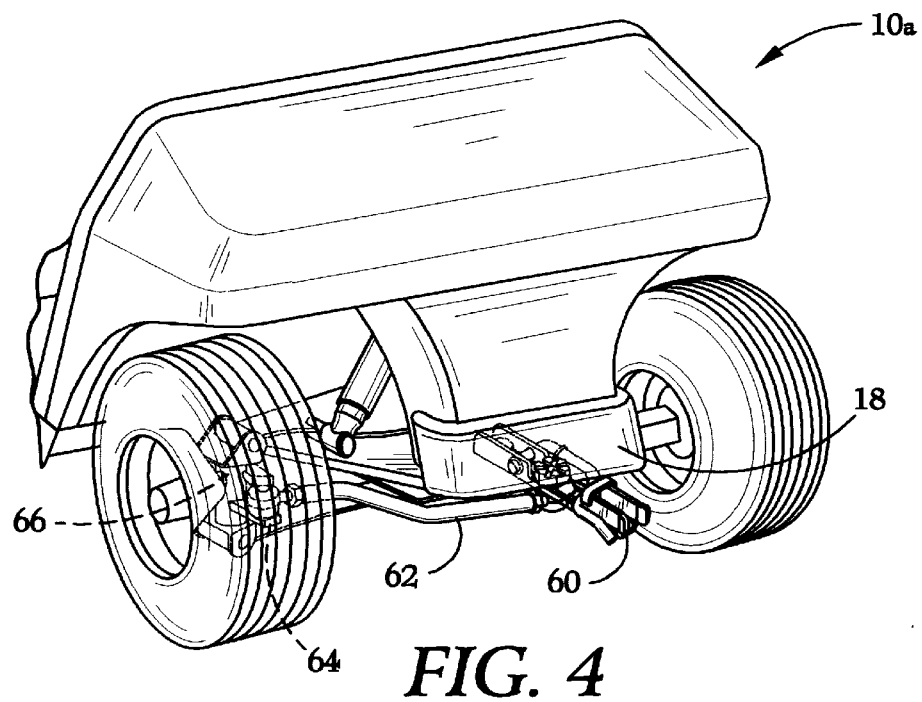
FIG. 4 is a fragmentary front perspective view of a golf car showing a towing bar receiver in accordance with the present invention.

The structure carried by a towed vehicle for engagement with towing bar 24 is shown in position at the front of a golf car 10*a* in the fragmentary front perspective view of FIG. 4. A towing bar receiver 60 is positioned on the vehicle frame at a point along the longitudinal axis of the vehicle and below front bumper 18 for pivotal movement about a vertical pivot axis. Receiver 60 is an elongated, channel-like member that in cross section has a U-shape. Preferably, receiver 60 defines a linearly extending slot that has a generally rectangular cross section and into which a towing bar can be inserted. A steering link 62 is pivotally connected with and extends laterally from towing bar receiver 60 to a towing lug 64 that extends outwardly from a steering spindle housing 66 that can be operatively connected with a steering system.

Figure 5:
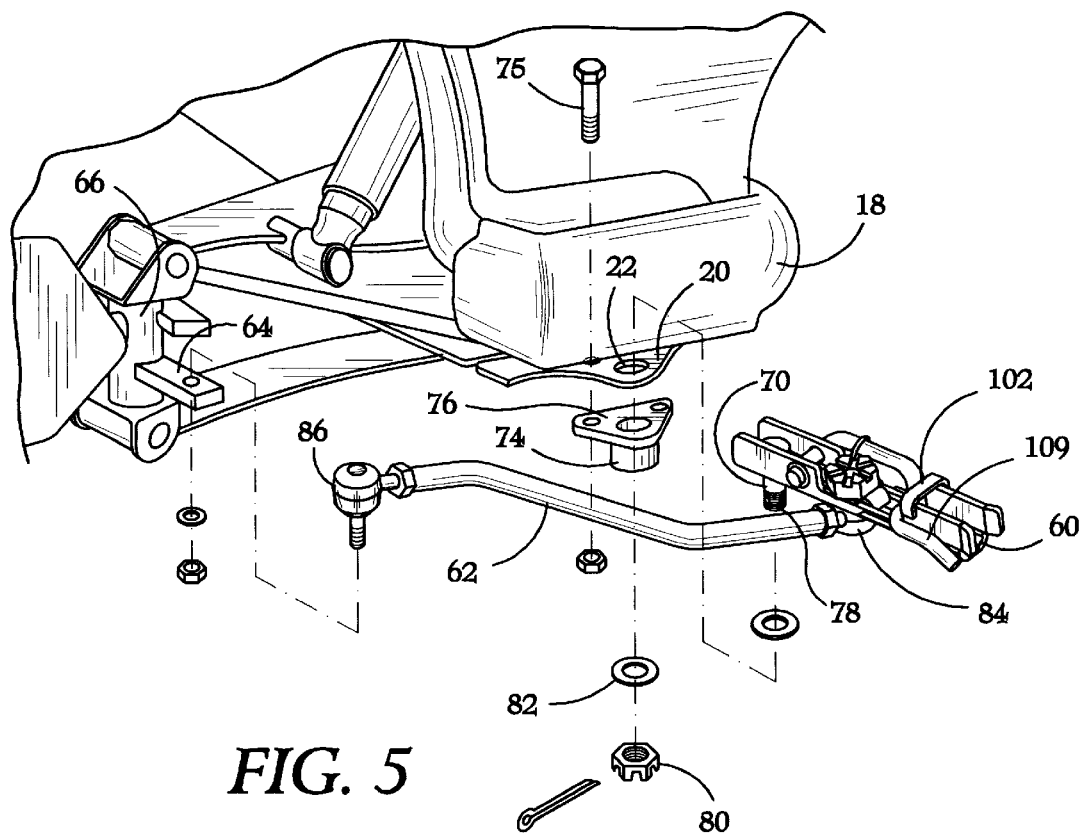
FIG. 5 is an enlarged, fragmentary perspective view, in exploded form, showing the several components of the towing bar receiver and associated connections with the frame and with a steering link of the golf car shown in FIG. 4.

Towing bar receiver 60 and its associated structure is shown in enlarged and exploded form relative to the vehicle frame in FIG. 5. Receiver 60 is pivotally supported by horizontally extending frame panel member 20 by means of a receiver pivot pin 70 that extends downwardly from receiver 60 at the innermost end thereof and that passes through an aperture 22 formed in panel member 20. A tubular sleeve 74 extends downwardly from a towing attachment bracket 76 that is bolted to panel member 68 by a pair of bolts 75, only one of which is shown in FIG. 5. Pin 70 is pivotally received in sleeve 74 and terminates in a threaded end 78 to which a nut 80 is threadedly attached for bearing against a belleville washer 82 that is in contact with the outermost end surface of sleeve 74. Positioned forwardly of receiver pivot pin 70, along the longitudinal axis of receiver 60, is the ball of an inner ball joint connection 84 that receives a socket carried at the innermost end of steering link 62. The opposite or outermost end of link 62 includes an outer ball joint connection 86 that is received in and is connected with towing lug 64.

Figure 6:
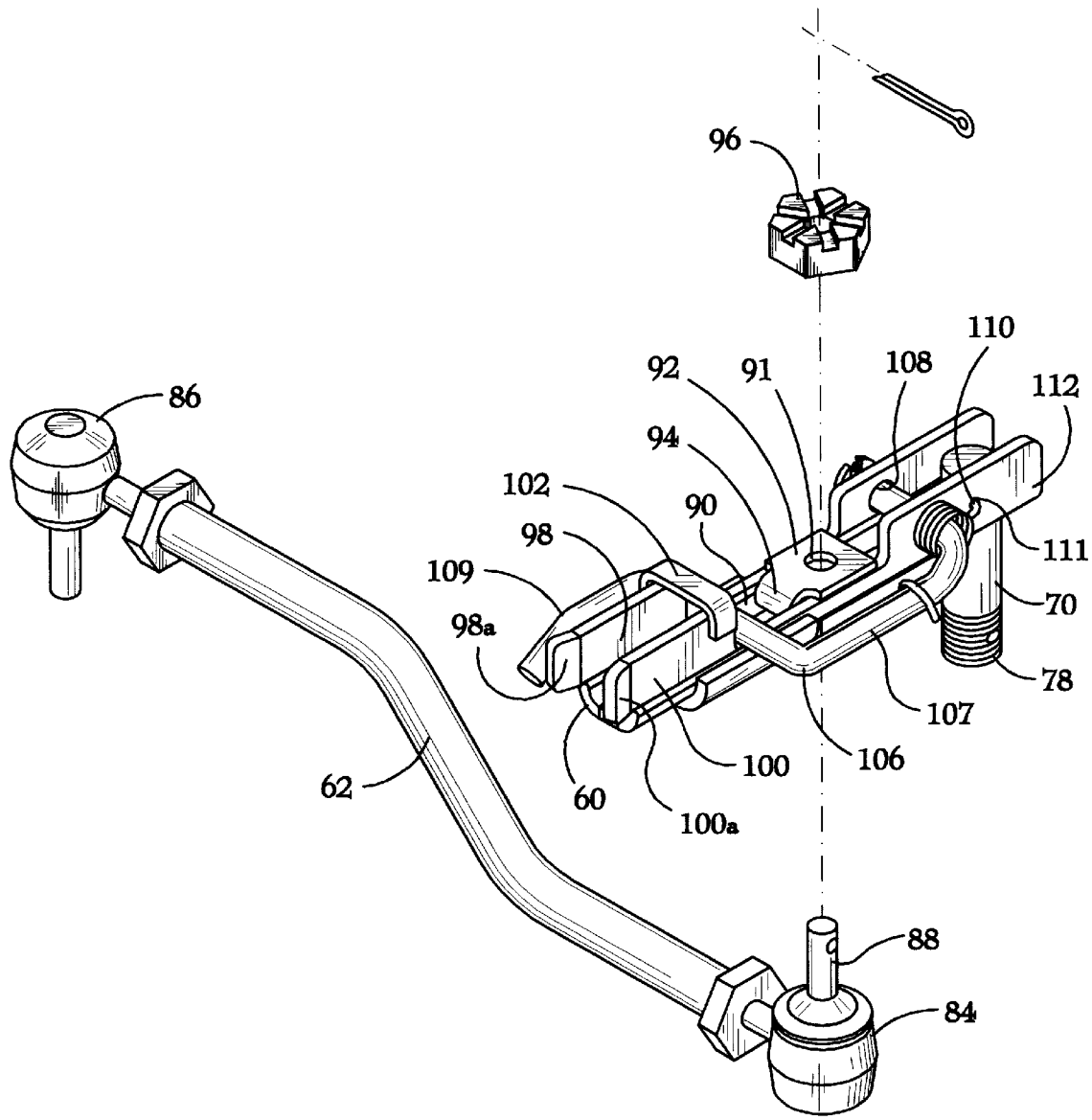
FIG. 6 is a further enlarged, perspective view, in partially exploded form, of the towing bar receiver and associated steering link sown in FIG. 5.
Figure 7:
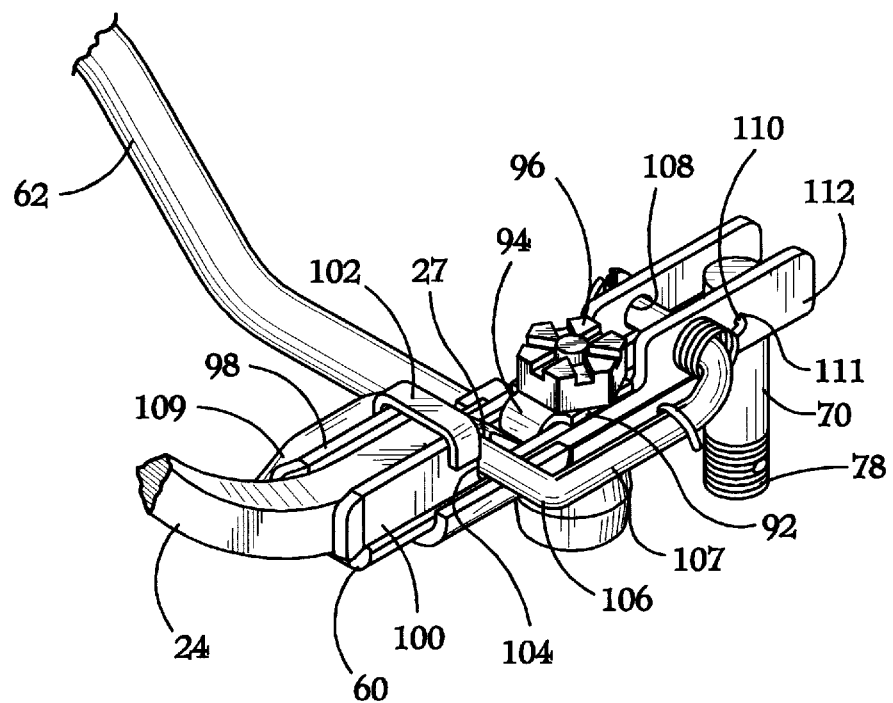
FIG. 7 is an enlarged, fragmentary perspective view of a towing bar and a towing bar receiver in accordance with the present invention, showing the towing bar positioned within the towing bar receiver and in its towing position.
Figure 8:
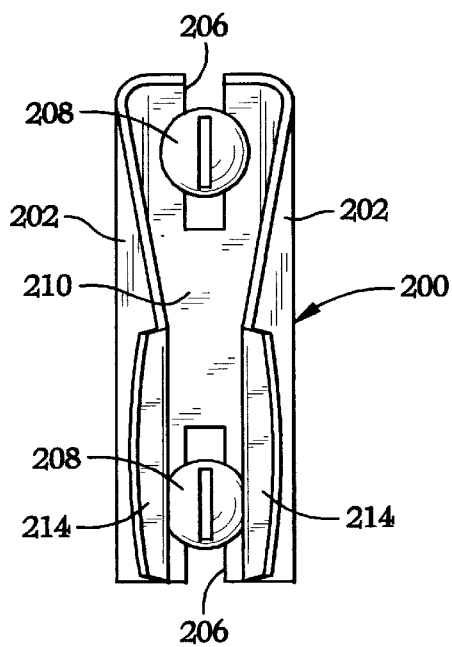
FIG. 8 is a front elevational view of an alternate embodiment of a towing bar gripper.
Figure 9:
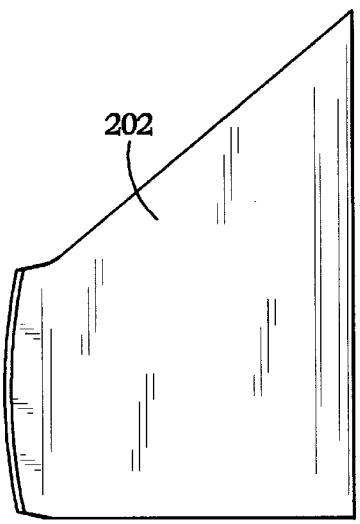
FIG. 9 is a side view of the gripper of FIG. 8.
Figure 10:
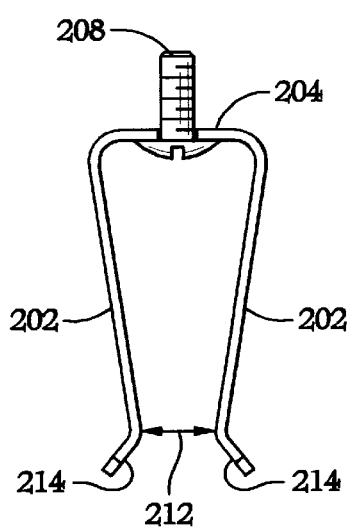
FIG. 10 is a top view of the gripper of FIG. 9.
Figure 11:
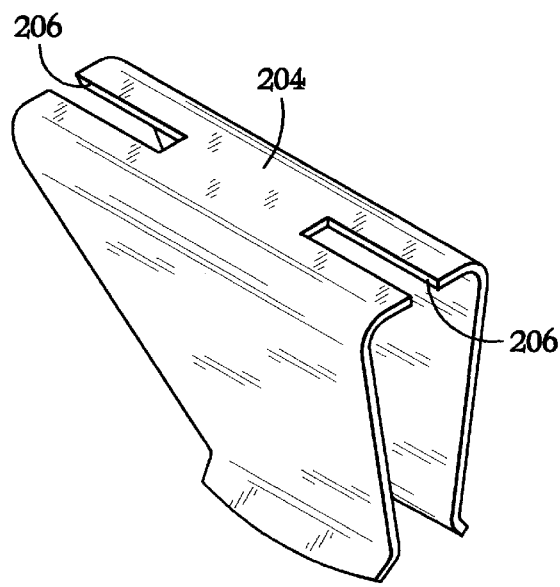
FIG. 11 is a rear perspective view of the gripper of FIG. 10.

As best seen in FIGS. 6 and 7, inner ball joint connection 84 includes an upwardly extending pin 88 that passes through an aperture (not shown) provided in the base portion 90 of towing bar receiver 60 and that is positioned forwardly of the axis of receiver pivot pin 70. Pin 88 extends through an aperture 91 provided in a towing bar stop member 92, and a lock nut 96 is threadedly received by pin 88 to connect inner ball joint 84 to towing bar receiver 60. As shown, stop member 92 includes a forward end 94 to engage the forward end of towing bar 24.

The forward most end of towing bar receiver 60 is defined by horizontally extending lower plate member 90 and a pair of laterally spaced, upwardly extending side walls 98, 100. Each of side walls 98 and 100 has a forward end 98*a* and 100*a*, respectively, that defines an outwardly flared guide panel that is angularly positioned relative to the longitudinal axis of towing bar receiver 60, to define a guide arrangement for guiding a towing bar into the interior of towing receiver 60. Positioned inwardly of the outwardly flared end of towing bar receiver 60, along its longitudinal axis, is a cap 102 that extends across side walls 98 and 100 to define a top wall of a towing bar receiver passageway having a generally rectangular cross section, within which towing bar 24 is adapted to fit.

A recessed area defined by notches 104 (only one of which is visible in FIGS. 6 and 7) formed in each of side walls 98 and 100 is adapted to receive a towing hook retainer member 106 that extends transversely across towing bar receiver 60. Retainer member 106 is a substantially U-shaped member, one leg of which is received against notches 104 and the other leg of which is pivotally received in a pair of opposed apertures 108 (only one of which is visible in FIGS. 6 and 7) for pivotal movement therewithin.

Retainer member 106 includes a forwardly-extending let 109 that can be gripped to pivot retainer member 106 about the pivot axis defined by apertures 108. Leg 109 extends along and is spaced laterally outwardly from the outermost surface of side wall 98, as shown in FIGS. 6 and 7. One end of a torsion spring 110 is received in an aperture 111 formed in rear sidewall 112 and has its other end looped over leg 107 of hook refiner member 106 to urge retainer member 106 against notch 104, as shown.

FIG. 7 shows an enlarged view of towing bar receiver 60 with a towing bar 24 positioned and retained therewithin for towing. Towing bar 24 is slidably received at the forwardmost end of towing bar receiver 60 between front sidewalls 98 and 100 and between lower plate member 90 and cap 102. The forwardmost end of towing bar 24 abuts forward end 94 of towing bar stop 92. When so positioned, notch 27 of towing bar 24 is positioned rearwardly of cap member 102, adjacent notches 104, so that the forwardmost leg of hook retainer member 106 is received within notch 27 to thereby securely hold towing bar 24 within towing bar receiver 60 and prevent longitudinal movement of towing bar 24 relative to towing bar receiver 60.

When towing bar 24 is desired to be disengaged from towing bar receiver 60, hook retainer member 106 is pivoted upwardly by lifting forwardly extending leg 109 upwardly about the pivot axis defined by apertures 108 to withdraw retainer member 106 from notch 27, to thereby permit towing bar 24 to be withdrawn, in a forward direction, from towing bar receiver 60. Thereafter hook retainer member 106 can be permitted to return to its position adjacent notches 104.

It can thus be seen that the present invention permits one golf car to conveniently tow another golf car from the garage to the pro shop area, or to or from somewhere on the course to the garage for repairs, if necessary. Additionally, if desired, a train of golf cars can be formed and can be towed by a single golf car from one position on the golf course to another.

The present invention is herein described in the context of its use on a golf car. However, it will be appreciated that the invention has substantially wider field of application, and it can also be used on other types of vehicles, such as utility vehicles, and can readily be adapted for use with airplanes, and other wheeled vehicles.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A wheeled vehicle including a frame having a longitudinal axis, a front wheel assembly and a rear wheel assembly, each wheel assembly rotatably carried by the frame, a body supported by the frame for carrying a load, and a steering system connected to at least one of the wheel assemblies for steering the vehicle, the improvement comprising:

a. a first elongated towing bar mounted on a first end of the vehicle;

b. first means for mounting said first towing bar pivotably about a first, substantially vertical, pivot axis positioned at the frame longitudinal axis;

c. second means for mounting said first towing bar pivotably about a second, substantially horizontal, pivot axis transverse to the frame longitudinal axis, wherein said first towing bar can be pivoted between an extended position and a retracted position;

d. means on said vehicle for releasably retaining said first towing bar in said retracted position, said means for releasably retaining said first towing bar comprising:
  i. a support member mounted on the vehicle body adjacent the first end of the vehicle; and
  ii. gripper means on said support member for releasably gripping an end of said first towing bar, said gripper means further comprising:
    aa. a rigid, generally U-shaped frame, said frame forming a slot extending vertically in a plane coincident with said first pivot axis of said first towing bar, said slot being open in a direction facing said first towing bar; and
    bb. said frame being adapted to resiliently open to receive and frictionally and releasably retain an end of said first towing bar in a retracted position;

e. a towing bar receiver means at a second end of the vehicle for receiving an end of a second elongated towing bar carried by a second towing vehicle, said receiver means having a central longitudinal axis substantially coincident with the frame longitudinal axis, said receiver means being pivotable about a third, substantially vertical, pivot axis positioned at the frame longitudinal axis; and f. coupling means, positioned substantially beneath the vehicle body, operatively connecting said receiver means to the vehicle steering system for causing the steering system to respond to pivoting movement of said receiver means.

* * * * *